(12) United States Patent
Birkett et al.

(10) Patent No.: US 8,362,112 B2
(45) Date of Patent: Jan. 29, 2013

(54) CURE ACCELERATORS FOR ANAEROBIC CURABLE COMPOSITIONS

(75) Inventors: David P. Birkett, Kildare (IE); Martin Wyer, Meath (IE); Andrew Messana, Newington, CT (US); David P. Dworak, East Hartford, CT (US); Anthony F. Jacobine, Meriden, CT (US)

(73) Assignees: Henkel Ireland Limited, Dublin (IE); Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/284,176

(22) Filed: Oct. 28, 2011

(65) Prior Publication Data

US 2012/0129994 A1    May 24, 2012

Related U.S. Application Data

(63) Continuation of application No. PCT/US2010/032869, filed on Apr. 9, 2010.

(60) Provisional application No. 61/174,652, filed on May 1, 2009.

(51) Int. Cl.
C07D 215/06 (2006.01)
C08F 120/34 (2006.01)
C09J 4/00 (2006.01)

(52) U.S. Cl. ........ 523/176; 546/165; 548/490; 548/491; 526/75; 526/204; 526/260; 526/263; 526/302; 526/320

(58) Field of Classification Search ............ 526/75, 526/204, 260, 263, 302, 320; 546/165; 548/490, 548/491; 523/176
See application file for complete search history.

(56) References Cited

U.S. PATENT DOCUMENTS 3,218,305 A    11/1965  Krieble
3,970,505 A     7/1976  Hauser et al.
(Continued)

FOREIGN PATENT DOCUMENTS

DE    1 817 989    11/1981
DE    2 806 701     6/1985
(Continued)

OTHER PUBLICATIONS

STN Structure Search Results, Aug. 7, 2012.*

(Continued)

*Primary Examiner* — Vu A Nguyen
(74) *Attorney, Agent, or Firm* — Steven C. Bauman

(57) ABSTRACT

The present invention relates to cure accelerators useful for anaerobic curable compositions, such as adhesives and sealants. The cure accelerators are constructed as urethane/urea/thiourethane (meth)acrylate resins from diols and include a unit embraced within structure A

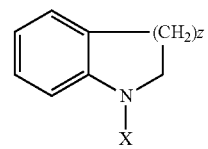

A where X is $C_{1-20}$ alkyl, $C_{2-20}$ alkenyl, or $C_{7-20}$ alkaryl, any of which may be interrupted by one or more hereto atoms, and which are functionalized by at least one and preferably at least two groups selected from —OH, —$NH_2$ or —SH and z is 1-3.

16 Claims, 3 Drawing Sheets

U.S. PATENT DOCUMENTS

| | | | |
|---|---|---|---|
| 4,180,640 | A | 12/1979 | Melody et al. |
| 4,287,330 | A | 9/1981 | Rich |
| 4,287,350 | A | 9/1981 | Hullstrung et al. |
| 4,321,349 | A | 3/1982 | Rich |
| 4,324,349 | A | 4/1982 | Kaufman |
| 4,588,639 | A | 5/1986 | Ozono |
| 4,812,497 | A | 3/1989 | Mochizuki |
| 5,041,508 | A | 8/1991 | Haruna et al. |
| 5,411,988 | A | 5/1995 | Bockow et al. |
| 5,489,622 | A | 2/1996 | Hara et al. |
| 5,605,999 | A | 2/1997 | Chu et al. |
| 5,811,473 | A | 9/1998 | Ramos et al. |
| 6,391,993 | B1 | 5/2002 | Attarwala et al. |
| 6,583,289 | B1 | 6/2003 | McArdle et al. |
| 6,835,762 | B1 | 12/2004 | Kelmarczyk et al. |
| 6,852,778 | B1 | 2/2005 | Kusuyama |
| 6,897,277 | B1 | 5/2005 | Klemarczyk et al. |
| 6,958,368 | B1 | 10/2005 | Klemarczyk et al. |
| 7,411,025 | B1 | 8/2008 | Messana et al. |
| 2003/0171467 | A1 | 9/2003 | Kneafsey et al. |

FOREIGN PATENT DOCUMENTS

| | | |
|---|---|---|
| FR | 1581361 | 9/1969 |
| JP | 07-308757 | 11/1995 |

OTHER PUBLICATIONS

International Search Report issued in connection with International Patent Application No. PCT/US2010/032869 mailed on Jan. 17, 2011.

R.D. Rich, "Anaerobic Adhesives" in Handbook of Adhesive Technology, 29, 467-79, A. Pizzi and K.L. Mittal, eds., Marcel Dekker, Inc., New York (1994).

Declan Raftery et al., Int. J. Adhesion and Adhesives, vol. 17, pp. 349-52 (1997).

* cited by examiner

CURE ACCELERATORS FOR ANAEROBIC CURABLE COMPOSITIONS

BACKGROUND OF THE INVENTION

1. Field of the Invention

The present invention relates to cure accelerators useful for anaerobic curable compositions, such as adhesives and sealants. The cure accelerators are constructed as urethane/urea/thiourethane (meth)acrylate resins from diols and include a unit embraced within structure A

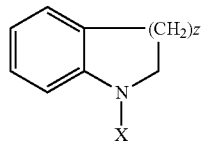

where X is $C_{1-20}$ alkyl, $C_{2-20}$ alkenyl, or $C_{7-20}$ alkaryl, any of which may be interrupted by one or more hereto atoms, and which are functionalized by at least one and preferably at least two groups selected from —OH, —NH$_2$ or —SH and z is 1-3.

2. Brief Description of Related Technology

Anaerobic adhesive compositions generally are well-known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Often, such anaerobic adhesive compositions also contain accelerator components to increase the speed with which the composition cures.

Desirable anaerobic cure-inducing compositions to induce and accelerate cure may include one or more of saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. The LOCTITE-brand anaerobic adhesive products currently available from Henkel Corporation use either saccharin alone or both saccharin and APH in most of its anaerobic adhesives. These components however have come under regulatory scrutiny in certain parts of the world, and thus efforts have been undertaken to identify candidates as replacements.

Examples of other curatives for anaerobic adhesives include thiocaprolactam (e.g., U.S. Pat. No. 5,411,988) and thioureas [e.g., U.S. Pat. No. 3,970,505 (Hauser) (tetramethyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

Loctite (R&D) Ltd. discovered a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom. See U.S. Pat. No. 6,583,289 (McArdle).

U.S. Pat. No. 6,835,762 (Klemarczyk) provides an anaerobic curable composition based on a (meth)acrylate component with an anaerobic cure-inducing composition substantially free of acetyl phenylhydrazine and maleic acid and an anaerobic cure accelerator compound having the linkage —C(=O)—NH—NH— and an organic acid group on the same molecule, provided the anaerobic cure accelerator compound excludes 1-(2 carboxyacryloyl)-2-phenylhydrazine. The anaerobic cure accelerator is embraced by:

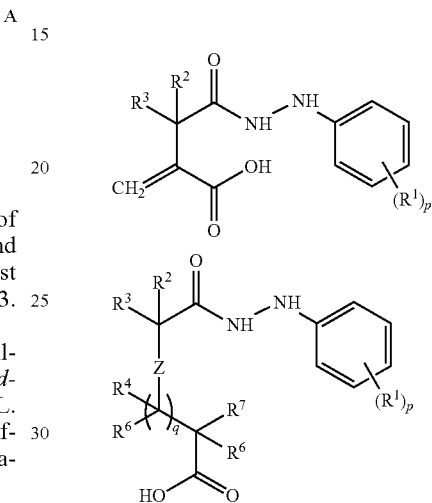

where $R^1$-$R^7$ are each independently selected from hydrogen and $C_{1-4}$; Z is a carbon-carbon single bond or carbon-carbon double bond; q is 0 or 1; and p is an integer between 1 and 5, examples of which are 3-carboxyacryloyl phenylhydrazine, methyl-3-carboxyacryloyl phenylhydrazine, 3-carboxypropanoyl phenylhydrazine, and methylene-3-carboxypropanoyl phenylhydrazine.

U.S. Pat. No. 6,897,277 (Klemarczyk) provides an anaerobic curable composition based on a (meth)acrylate component with an anaerobic cure-inducing composition substantially free of saccharin and an anaerobic cure accelerator compound within the following structure

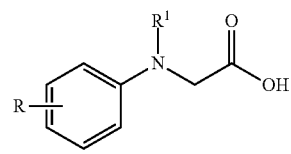

where R is selected from hydrogen, halogen, alkyl, alkenyl, hydroxyalkyl, hydroxyalkenyl, carboxyl, and sulfonato, and $R^1$ is selected from hydrogen, alkyl, alkenyl, hydroxyalkyl, hydroxyalkenyl, and alkaryl, an example of which is phenyl glycine and N-methyl phenyl glycine.

U.S. Pat. No. 6,958,368 (Messana) provides an anaerobic curable composition. This composition is based on a (meth) acrylate component with an anaerobic cure-inducing composition substantially free of saccharin and within the following structure

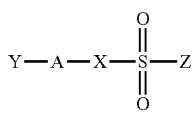

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded from the structure. Examples of the anaerobic cure accelerator compound embraced by the structure above include 2-sulfobenzoic acid cyclic anhydride, and 3H-1,2-benzodithiol-3-one-1,1-dioxide.

Three Bond Co. Ltd., Tokyo, Japan has in the past described as a component in anaerobic adhesive and sealant compositions a component called tetrahydroquinoline ("THQ").

Notwithstanding the state of the art, there is an on-going desire to find alternative technologies for anaerobic cure accelerators to differentiate existing products and provide supply assurances in the event of shortages or cessation of supply of raw materials. Moreover, since certain of the raw materials used in conventional anaerobic cure inducing compositions have to one degree or another come under regulatory scrutiny, alternative components for anaerobic cure inducing compositions would be desirable. Accordingly, it would be desirable to identify new materials that function as cure components in the cure of anaerobically curable compositions.

SUMMARY OF THE INVENTION

In the broadest sense, reaction products are provided by the present invention which are prepared from reactants comprising:

(a) compounds within structure A

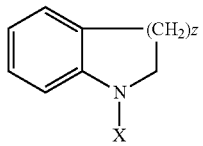

where X is $C_{1-20}$ alkyl, $C_{2-20}$ alkenyl, or $C_{7-20}$ alkaryl, any of which may be interrupted by one or more hereto atoms, and which are functionalized by at least one and preferably at least two groups selected from —OH, —NH$_2$ or —SH and z is 1-3; and (b) at least one isocyanate functional material.

For instance, compounds within structure A may be prepared as follows:

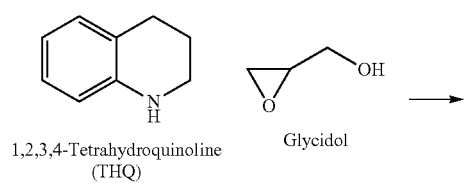

1,2,3,4-Tetrahydroquinoline (THQ)  Glycidol

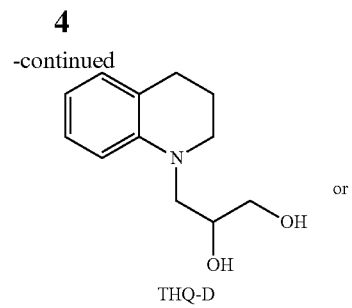

THQ-D

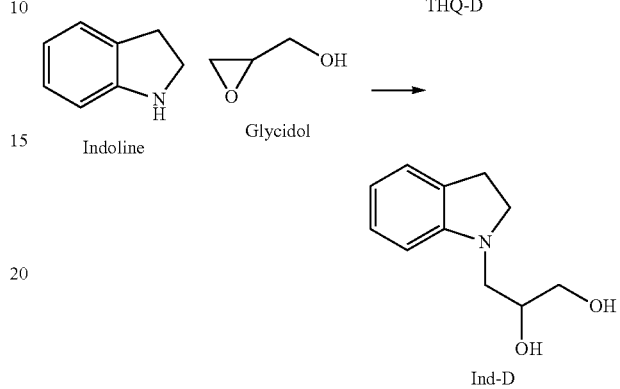

Ind-D

THQ-D and Ind-D are isomeric mixtures, represented as follows:

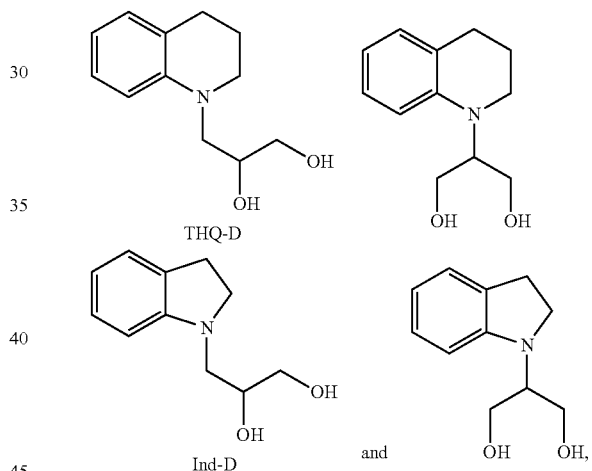

respectively.

The unit in the cure accelerator embraced by structure A may be prepared from reactants comprising: (a) at least one compound selected from compounds represented by structure I:

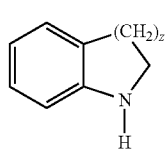

where z is 1-3; and (b) at least one compound selected from compounds represented by structure II:

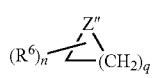

where Z" is selected from —O—, —S—, or —NH—; q is 1-2; $R^6$ is Independently selected from hydroxyalkyl, aminoalkyl, or thioalkyl; and n is at least 1, where the reaction product comprises at least two pendant functional groups independently selected from —OH, —NH$_2$ or —SH.

The reaction product may also comprise as a reactant from which it is prepared (a) hydroxy, thio and/or amino functional (meth)acrylates and hydroxy functional vinyl ethers, a diol and/or (c) a (meth)acrylate component.

Thus, in a particularly desirable aspect, the Present invention relates to cure accelerators useful for anaerobic curable compositions, such as adhesives and sealants. The cure accelerators are constructed as urethane/urea/thiourethane (meth) acrylate resins from diols and include a unit embraced within structure A

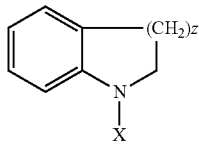

where X is C$_{1-20}$ alkyl, C$_{2-20}$ alkenyl, or C$_{7-20}$ alkaryl, any of which may be interrupted by one or more hereto atoms, and which are functionalized by at least one and preferably at least two groups selected from —OH, —NH$_2$ or —SH and z is 1-3.

Methods of making reaction products are also provided by the present invention as well, which are prepared from reactants comprising reacting: (a) compounds represented by structure A; and (b) at least one isocyanate functional material; and (c) optionally hydroxy, thio and/or amino functional (meth)acrylates and hydroxy functional vinyl ethers; and (d) optionally a (meth)acrylate component.

The reaction product is useful as a component together with a (meth)acrylate component and an anaerobic cure-inducing composition in the formulation of anaerobic curable compositions, such as adhesives and sealants.

DETAILED DESCRIPTION OF THE INVENTION

Figure 1:
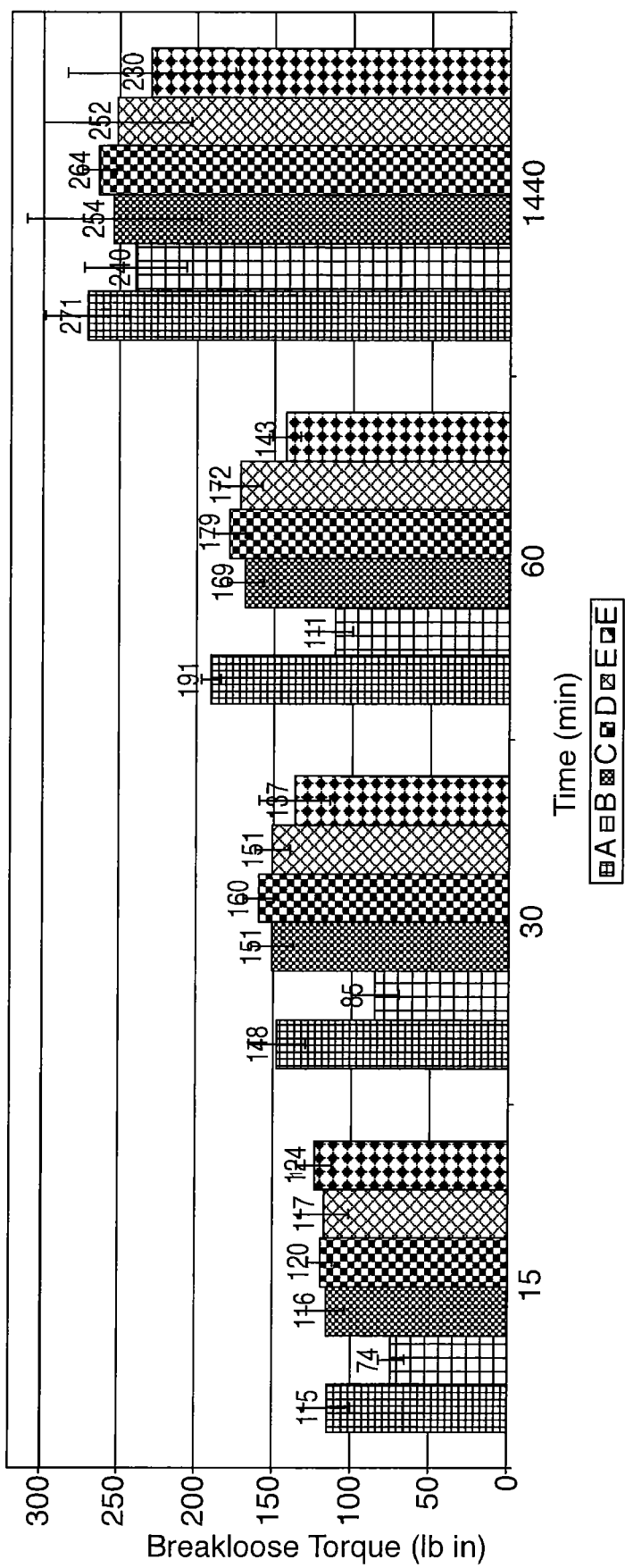
FIG. 1 depicts a plot of shear strength vs. time of anaerobic adhesive compositions including Resin 1 (made from about 7% w/w THQ-glycidol adduct), some of which using the inventive cure accelerators, on steel pin and collars.

The present invention relates to reaction products useful as cure accelerators for anaerobic compositions. The addition of such reaction products as cure accelerators into anaerobic adhesives as a replacement for some or all of the amount of conventional anaerobic cure accelerators (such as toluidines and/or acetyl phenylhydrazine) surprisingly provides at least comparable cure speeds and physical properties for the reaction products formed therefrom, as compared with those observed from conventional anaerobic curable compositions.

As noted above, reaction products are provided in the present invention prepared from reactants comprising:
(a) compounds within structure A

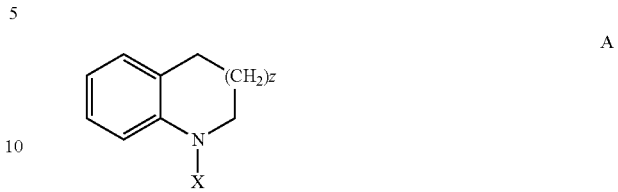

where X is C$_{1-20}$ alkyl, C$_{2-20}$ alkenyl, or C$_{7-20}$ alkaryl, any of which may be interrupted by one or more hereto atoms, and which are functionalized by at least one and preferably at least two groups selected from —OH, —NH$_2$ or —SH and z is 1-3, and (b) at least one isocyanate functional material.

As discussed above, the reaction product comprises at least two (desirably three) pendant functional groups independently selected from —OH, —NH$_2$ or —SH, desirably hydroxy functional groups.

The compound of structure A—which forms a unit in the reaction products of the present invention—desirably is based on THQ, indoline or indole.

The reaction between the compound of structure A and isocyanate functional material may be conducted in the presence of a solvent. In that case, the compound of structure A may be dissolved in solvent prior to reaction with the isocyanate functional material, or vice versa. Examples of suitable solvents include mineral spirits, alcohols such as methanol, ethanol or butanol, aromatic hydrocarbons such as xylene, glycol ethers such as ethylene glycol monobutyl ether, esters, aliphatics, and mixtures of any of the foregoing.

The temperature employed in the reaction may also vary over a wide range. Where the components are combined in approximately chemical equivalent amounts or with slight excess of the isocyanate reactant, useful temperatures may vary from room temperature or below, e.g., 10° C. to 15° C., up to and including temperatures of 100° C. to 175° C. Where reacting the simpler isocyanates, the components are preferably combined at or near room temperature, such as temperatures ranging from 20° C. to 30° C. In the preparation of the high molecular weight isocyanate adducts using an excess of the isocyanate, the reactants may be combined at room temperature or preferably heated at temperatures ranging from about 40° C. to about 150° C. Reactions conducted at about 90° C. to 120° C. have been found to proceed smoothly.

The reaction product(s) may be purified to remove impurities, such as reaction by-products or impurities that accompany the reactants such as carriers. The reaction product(s) can be purified for example by distillation, filtration, stripping or chromatography, such that the purified reaction product(s) are essentially free of impurities, or comprise less than about 1 weight percent of impurities, or are free of impurities.

As used herein, the term "isocyanate functional material" includes compounds, monomers, oligomers and polymers comprising at least one or at least two —N═C═O functional groups and/or at least one or at least two —N═C═S (isothiocyanate) groups. Monofunctional isocyanates can be used as chain terminators or to provide terminal groups during polymerization. As used herein, "polyisocyanate" means an isocyanate comprising at least two —N═C═O functional groups, such as diisocyanates or triisocyanates, as well as dimers and trimers or biurets of the isocyanates, and mixtures thereof. Suitable isocyanates are capable of forming a covalent bond with a reactive group such as hydroxy functional group. Isocyanates useful in the present invention can be branched or unbranched.

Isocyanates useful in the present invention include "modified", "unmodified" and mixtures of "modified" and "unmodified" isocyanates. The isocyanates can have "free", "blocked" or partially blocked isocyanate groups. The term "modified" means that the aforementioned isocyanates are changed in a known manner to introduce biuret, urea, carbodiimide, urethane or isocyanurate groups or blocking groups. The "modified" isocyanate is obtained by cycloaddition processes to Yield dimers and trimers of the isocyanate, i.e., polyisocyanates. Free isocyanate groups are extremely reactive. In order to control the reactivity of isocyanate group-containing components, the NCO groups may be blocked with certain selected organic compounds that render the isocyanate group inert to reactive hydrogen compounds at room temperature. When heated to elevated temperatures, e.g., ranging from about 90° C. to about 200° C., the blocked isocyanates release the blocking agent and react in the same way as the original unblocked or free isocyanate.

Generally, compounds used to block isocyanates are organic compounds that have active hydrogen atoms, e.g., volatile alcohols, epsilon-caprolactam or ketoxime compounds. Examples of suitable blocking compounds include phenol, cresol, nonylphenol, epsilon-caprolactam and methyl ethyl ketoxime.

As used herein, the NCO in the NCO:OH ratio represents the free isocyanate of free isocyanate-containing materials, and of blocked or partially blocked isocyanate-containing materials after the release of the blocking agent. In some cases, it is not possible to remove all of the blocking agent. In those situations, more of the blocked isocyanate-containing material would be used to attain the desired level of free NCO.

The molecular weight of the isocyanate functional material can vary widely. In alternate embodiments, the number average molecular weight (Mn) of each can be at least about 100 grams/mole, or at least about 150 grams/mole, or less than about 15,000 grams/mole, or less than about 5,000 grams/mole. The number average molecular weight can be determined using known methods, such as by gel permeation chromatography (GPC) using polystyrene standards.

Examples of suitable isocyanate functional materials include aliphatic, cycloaliphatic, aromatic and heterocyclic isocyanates, dimers and trimers thereof, and mixtures thereof. When an aromatic polyisocyanate is used, generally care should be taken to select a material that does not cause the polyurethane to color (e.g., yellow).

The aliphatic and cycloaliphatic diisocyanates can comprise about 6 to about 100 carbon atoms linked in a straight chain or cyclized and having two isocyanate reactive end groups.

Examples of suitable aliphatic isocyanates include straight chain isocyanates such as ethylene diisocyanate, trimethylene diisocyanate, 1,6-hexamethylene diisocyanate (HDI), tetramethylene diisocyanate, hexamethylene diisocyanate, octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, and bis(isocyanatoethyl)ether.

Other examples of suitable aliphatic isocyanates include branched isocyanates such as trimethylhexane diisocyanate, trimethylhexamethylene diisocyanate (TMDI), 2,2'-dimethylpentane diisocyanate, 2,2,4-trimethylhexane diisocyanate, 2,4,4,-trimethylhexamethylene diisocyanate, 1,8-diisocyanato-4-(isocyanatomethyl)octane, 2,5,7-trimethyl-1,8-diisocyanato-5-(isocyanatomethyl) octane, 2-isocyanatopropyl-2,6-diisocyanatohexanoate, lysinediisocyanate methyl ester and lysinetriisocyanate methyl ester.

Examples of suitable cycloaliphatic isocyanates include dinuclear compounds bridged by an isopropylidene group or an alkylene group of 1 to 3 carbon atoms. examples of suitable cycloaliphatic isocyanates include 1,1'-methylene-bis-(4-isocyanatocyclohexane) or 4,4'-methylene-bis-(cyclohexyl isocyanate) (such as DESMODUR W commercially available from Bayer Corp.), 4,4'-isopropylidene-bis-(cyclohexyl isocyanate), 1,4-cyclohexyl diisocyanate (CHDI), 4,4'-dicyclohexylmethane diisocyanate, 3-isocyanato methyl-3,5,5-trimethylcyclohexyl isocyanate (a branched isocyanate also known as isophorone diisocyanate or IPDI) which is commercially available from Arco Chemical Co. and meta-tetramethylxylylene diisocyanate [a branched isocyanate also known as 1,3-bis(1-isocyanato-1-methylethyl)-benzene which is commercially available from Cytec Industries Inc. under the tradename TMXDI (Meta) Aliphatic Isocyanate] and mixtures thereof.

Other useful dinuclear cycloaliphatic diisocyanates include those formed through an alkylene group of from 1 to 3 carbon atoms inclusive, and which can be substituted with nitro, chlorine, alkyl, alkoxy and other groups that are not reactive with hydroxyl groups (or active hydrogens) providing they are not positioned so as to render the isocyanate group unreactive. Also, hydrogenated aromatic diisocyanates such as hydrogenated toluene diisocyanate may be used. Dinuclear diisocyanates in which one of the rings is saturated and the other unsaturated, which are prepared by partially hydrogenating aromatic diisocyanates such as diphenyl methane diisocyanates, diphenyl isopropylidene diisocyanate and diphenylene diisocyanate, may also be used.

Mixtures of cycloaliphatic diisocyanates with aliphatic diisocyanates and/or aromatic diisocyanates may also be used. An example is 4,4'-methylene-bis-(cyclohexyl isocyanate) with commercial isomer mixtures of toluene diisocyanate or meta-phenylene diisocyanate.

Thioisocyanates corresponding to the above diisocyanates can be used, as well as mixed compounds containing both an isocyanate and a thioisocyanate group.

Examples of suitable isocyanate functional materials can include but are not limited to DESMODUR W, DESMODUR N 3300 (hexamethylene diisocyanate trimer), DESMODUR N3400 (60% hexamethylene diisocyanate dimer and 40% hexamethylene diisocyanate trimer), which are commercially available from Bayer Corp.

Other examples of suitable polyisocyanates include ethylenically unsaturated polyisocyanates; alicyclic polyisocyanates; aromatic polyisocyanates; aliphatic polyisocyanates; halogenated, alkylated, alkoxylated, nitrated, carbodiimide modified, urea modified and biuret modified derivatives of isocyanates; and dimerized and trimerized products of isocyanates.

Examples of suitable ethylenically unsaturated polyisocyanates include butene diisocyanate and 1,3-butadiene-1,4-diisocyanate. Examples of suitable alicyclic polyisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of suitable aromatic polyisocyanates include α,α'-xylene diisocyanate, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl) naphthalene, bis(isocyanatomethyl) diphenyl ether, bis(isocyanatoethyl) phthalate, mesitylene triisocyanate and 2,5-di(isocyanatomethyl)furan, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene diisocyanate, benzene triisocyanate, naphthalene diisocyanate, methylnaphthalene diisocyanate, biphenyl diisocyanate, toluidine diisocyanate, tolylidine diisocyanate, tolylene diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

The isocyanate functional material comprises at least one triisocyanate or at least one polyisocyanate trimer. Examples of such isocyanates include aromatic triisocyanates such as tris(4-iso-cyanatophenyl)methane (DESMODUR R), 1,3,5-tris(3-isocyanato-4-methylphenyl)-2,3,6-trioxohexahydro-1,3,5 triazine (DESMODUR IL); adducts of aromatic diisocyanates such as the adduct of 2,4-tolylene diisocyanate (TDI, 2,4-diisocyanatotoluene) and trimethylolpropane (DESMODUR L); and from aliphatic triisocyanates such as N-isocyanatohexylaminocarbonyl-N,N'-bis(isocyanatohexyl)urea (DESMODUR N), 2,4,6-trioxo-1,3,5-tris(6-isocyanatohexyl)hexahydro-1,3,5-triazine (DESMODUR N3390), 2,4,6-trioxo-1,3,5-tris(5-isocyanato-1,3,3-trimethylcyclo-hexylmethyl)hexahydro-1,3,5-triazine (DESMODUR Z4370), and 4-(isocyanatomethyl)-1,8-octane diisocyanate. The above DESMODUR products are commercially available from Bayer Corp. Also useful are the biuret of hexanediisocyanate, polymeric methane diisocyanate, and polymeric isophorone diisocyanate. Trimers of hexamethylene diisocyanate, isophorone diisocyanate and tetramethylxylylene diisocyanate.

The isocyanate functional material is a cycloaliphatic compound, such as a dinuclear compound bridged by an isopropylidene group or an alkylene group of 1 to 3 carbon atoms.

The isocyanate functional material is a diisocyanate, such as methylene bis(phenyl isocyanate) (also known as MDI); 2,4-toluene diisocyanate (2,4-TDI); a 80:20 mixture of 2,4- and 2,6-toluene diisocyanate (also known as TDI); 3-isocyanatomethyl-3,5,5-trimethyl cyclohexylisocyanate (IPDI); m-tetramethyl xylene diisocyanate (TMXDI); hexamethylene diisocyanate (HDI); and 4,4'-methylene-bis-(cyclohexyl isocyanate) (commercially available as DESMODUR W).

The isocyanate functional materials can comprise isocyanate functional (meth)acrylates.

The reaction product of compound(s) of structure A with the isocyanate functional material can comprise about 5 to about 99 weight percent of the total weight of the reactants used for preparing the reaction product, or about 50 to about 95 weight percent, or about 85 weight percent of the reactants. The isocyanate functional material can comprise about 1 to about 30 weight percent of the total weight of the reactants used for preparing the reaction product, or about 10 to about 30 weight percent, or about 25 weight percent of the reactants.

The reaction product of structure A and the isocyanate functional material can have residual isocyanate functionality which can be further reacted with hydroxy, thio and/or amino functional materials, such as hydroxy, thio and/or amino functional (meth)acrylates and hydroxy functional vinyl ethers.

Hydroxy functional reaction product(s) of compound(s) of structure A and isocyanate functional materials form urethane linkages. The so formed hydroxy functional reaction product is the reacted with polyisocyanate compound(s) to form an isocyanate functional urethane prepolymer and subsequently reacted with a reactive (meth)acrylate monomer, such as a hydroxy functional (meth)acrylate, to produce a di(meth)acrylate based polymer or resin which includes a functional accelerator moiety.

Amino functional reaction product of compound(s) of structure A is then reacted with isocyanate functional materials to form urea linkages. The so formed amino functional reaction product structure A is then reacted with polyisocyanate compound(s) form an isocyanate functional urea prepolymer and subsequently reacted with a reactive (meth)acrylate monomer, such as a hydroxy functional (meth)acrylate, to produce a di(meth)acrylate based polymer or resin which includes a functional accelerator moiety.

Thiol functional reaction product of compound(s) of structure A and isocyanate functional materials form carbamothioate linkages. The so formed thiol functional reaction product is then reacted with polyisocyanate compound(s) to form an isocyanate functional carbamothioate prepolymer and subsequently reacted with a reactive (meth)acrylate monomer, such as a hydroxy functional (meth)acrylate, to produce a di(meth) acrylate based polymer or resin which includes a functional accelerator moiety.

The phrase "hydroxyl-functional (meth)acrylate" means any hydroxyl-substituted acrylate or methacrylate compound that would be suitable for making and using a capped urethane material, examples of suitable ones include hydroxyethyl acrylate, hydroxypropyl acrylate, hydroxybutyl acrylate, hydroxyethyl methacrylate ("HEMA"), hydroxypropyl methacrylate ("HPMA"), hydroxybutyl methacrylate and mixtures thereof. Other examples of suitable hydroxy functional (meth)acrylates include 2-hydroxyethyl acrylate, 2-hydroxypropyl acrylate, 2-hydroxyethyl methacrylate ("HEMA"), pentaerythritol triacrylate ("PETA"), and 4-hydroxybutyl acrylate.

The phrase "hydroxy functional vinyl ether" means any hydroxy-substituted vinyl ether that would be suitable for making and using a capped urethane oligomers, examples of suitable ones include hydroxyethyl vinyl ethers, hydroxypropyl vinyl ethers, hydroxybutyl vinyl ethers and mixtures thereof, such as ethylene glycol monovinyl ether, and cyclohexane dimethanol monovinyl ether.

The hydroxy-functional (meth)acrylate can have a number average molecular weight of about 80 to about 1,000 grams/mole, or about 100 to about 800 grams/mole, or about 110 to about 600 grams/mole.

The hydroxy-functional (meth)acrylate can comprise about 1 to about 30 weight percent of the reactants used for preparing the urethane, or about 2 to about 15 weight percent of the reactants, or about 3 to about 12 weight percent of the reactants.

In some embodiments, the reaction product is prepared from an additional reactant selected from the hydroxy-, amino- and/or thio-functional compound(s). In these embodiments, the reaction product can have a number average molecular weight of about 100 to about 20,000 grams/mole, or about 500 to about 5,000 grams/mole, or about 3,000 grams/mole.

The hydroxy-, amino- and/or thio-functional compounds suitable for use in the preparation of the above monomeric products are exemplified by such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the like.

The reactants can further comprise at least one polyol. As used herein, the term "polyol" includes compounds, monomers, oligomers and polymers comprising at least two hydroxyl groups (such as diols) or at least three hydroxyl groups (such as triols), higher functional polyols and mixtures thereof. Suitable polyols are capable of forming a covalent bond with a reactive group such as an isocyanate functional group.

Examples of suitable polyols include hydrocarbon polyols, polyether polyols, polyester polyols and mixtures thereof. As used herein, hydrocarbon polyol means saturated aliphatic polyols, unsaturated aliphatic polyols such as olefins, alicyclic polyols and aromatic polyols.

Examples of suitable diols include straight chain alkane diols such as ethylene glycol, diethylene glycol, triethylene glycol, tetraethylene glycol, 1,2-ethanediol, propane diols such as 1,2-propanediol and 1,3-propanediol, butane diols such as 1,2-butanediol, 1,3-butanediol, and 1,4-butanediol, pentane diols such as 1,5-pentanediol, 1,3-pentanediol and 2,4-pentanediol, hexane diols such as 1,6-hexanediol and 2,5-hexanediol, heptane diols such as 2,4-heptanediol, octane diols such as 1,8-octanediol, nonane diols such as 1,9-nonanediol, decane diols such as 1,10-decanediol, dodecane diols such as 1,12-dodecanediol, octadecanediols such as 1,18-octadecanediol, sorbitol, mannitol, and mixtures thereof. The diol may be a propane diol such as 1,2-propanediol and 1,3-propanediol, or butane diol such as 1,2-butanediol, 1,3-butanediol, and 1,4-butanediol. One or more carbon atoms in the polyol can be replaced with one or more heteroatoms, such as N, S, or O, for example sulfonated polyols, such as dithio-octane bis diol, thiodiethanol such as 2,2-thiodiethanol, or 3,6-dithia-1,2-octanediol.

Other examples of suitable diols include those represented by the following formula:

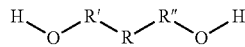

where here R represents $C_1$ to $C_{18}$ divalent linear or branched aliphatic, cycloaliphatic, aromatic, heterocyclic, or oligomeric saturated alkylene radical or mixtures thereof; $C_2$ to $C_{18}$ divalent organic radical containing at least one element selected from sulfur, oxygen and silicon in addition to carbon and hydrogen atoms; $C_5$ to $C_{18}$ divalent saturated cycloalkylene radical; or $C_5$ to $C_{18}$ divalent saturated heterocycloalkylene radical; and R' and R" can be present or absent and, if present, each independently represent $C_1$ to $C_{18}$ divalent linear or branched aliphatic, cycloaliphatic, aromatic or aryl, heterocyclic, polymeric, or oligomeric saturated alkylene radical or mixtures thereof.

Other examples of suitable diols include branched chain alkane diols, such as propylene glycol, dipropylene glycol, tripropylene glycol, neopentyl glycol, 2-methyl-butanediol, 2,2,4-trimethyl-1,3-pentanediol, 2-methyl-1,3-pentanediol, 2-ethyl-1,3-hexanediol, 2-methyl-1,3-propanediol, 2,2-dimethyl-1,3-propanediol, dibutyl 1,3-propanediol, polyalkylene glycols such as polyethylene glycols, and mixtures thereof.

The diol can be a cycloalkane diol, such as cyclopentanediol, 1,4-cyclohexanediol, cyclohexanedimethanols (CHDM), such as 1,4-cyclohexanedimethanol, cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane, and 4,8-bis(hydroxymethyl)tricyclo [$5.2.1.0^{2,6}$]decane and mixtures thereof.

The diol can be an aromatic diol, such as dihydroxybenzene, 1,4-benzenedimethanol, xylene glycol, hydroxybenzyl alcohol and dihydroxytoluene; bisphenols, such as, 4,4'-isopropylidenediphenol (bisphenol A), 4,4'-oxybisphenol, 4,4'-dihydroxybenzophenone, 4,4'-thiobisphenol, phenolphthalein, bis(4-hydroxyphenyl)methane, 4,4'-(1,2-ethenediyl) bisphenol and 4,4'-sulfonylbisphenol; hydrogenated bisphenols, halogenated bisphenols, such as 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, which can have, for example, ethoxy, propoxy, α-butoxy and β-butoxy groups; and biscyclohexanols, which can be prepared by hydrogenating the corresponding bisphenols, such as 4,4'-isopropylidene-biscyclohexanol, 4,4'-oxybiscyclohexanol, 4,4'-thiobiscyclohexanol and bis(4-hydroxycyclohexanol)methane, the alkoxylation product of 1 mole of 2,2-bis(4-hydroxyphenyl)propane (i.e., bisphenol-A) and 2 moles of propylene oxide, hydroxyalkyl terephthalates such as meta or para bis (2-hydroxyethyl) terephthalate, bis(hydroxyethyl) hydroquinone and mixtures thereof.

The diol can be an heterocyclic diol, for example a dihydroxy piperidine such as 1,4-bis(hydroxyethyl)piperazine; a diol of an amide or alkane amide [such as ethanediamide (oxamide)], for example N,N'-bis(2-hydroxyethyl)oxamide; a diol of a propionate, such as 2,2-dimethyl-3-hydroxypropyl-2,2-dimethyl-3-hydroxypropionate; a diol of a hydantoin, such as bishydroxypropyl hydantoin; a diol of a phthalate, such as meta or para bis(2-hydroxyethyl) terephthalate; a diol of a hydroquinone, such as a dihydroxyethylhydroquinone; and/or a diol of an isocyanurate, such as dihydroxyethyl isocyanurate.

Examples of trifunctional, tetrafunctional or higher polyols suitable for use include branched chain alkane polyols such as glycerol or glycerin, tetramethylolmethane, trimethylolethane (e.g., 1,1,1-trimethylolethane), trimethylolpropane (TMP) (e.g., 1,1,1-trimethylolpropane), erythritol, pentaerythritol, dipentaerythritol, tripentaerythritol, sorbitan, alkoxylated derivatives thereof and mixtures thereof.

The polyol can be a cycloalkane polyol, such as trimethylene bis(1,3,5-cyclohexanetriol); or an aromatic polyol, such as trimethylene bis(1,3,5-benzenetriol).

Further examples of suitable polyols include the aforementioned polyols which can be alkoxylated derivatives, such as ethoxylated, propoxylated and butoxylated. The following polyols can be alkoxylated with from 1 to 10 alkoxy groups: glycerol, trimethylolethane, trimethylolpropane, benzenetriol, cyclohexanetriol, erythritol, pentaerythritol, sorbitol, mannitol, sorbitan, dipentaerythritol and tripentaerythritol. Examples of suitable alkoxylated polyols include ethoxylated trimethylolpropane, propoxylated trimethylolpropane, ethoxylated trimethylolethane, and mixtures thereof.

The polyol can be an unsaturated aliphatic polyol such as NISSO GI-1000 hydroxy terminated, hydrogenated 1,2-polybutadiene (HPBD resin) having a calculated number average molecular weight of about 1500 and a hydroxyl value of about 60-120 KOH mg/g commercially available from Nippon Soda Co Ltd.

The polyol for use in the present invention can be an SH-containing material, such as a dithiol or polythiol, examples of which include aliphatic polythiols, cycloaliphatic polythiols, aromatic polythiols, heterocyclic polythiols, polymeric polythiols, oligomeric polythiols and mixtures thereof. As used herein, the terms "thiol," "thiol group," "mercapto" or "mercapto group" refer to an —SH group which is capable of forming a thiourethane linkage (i.e., —NH—C(O)—S—) with an isocyanate group or a dithiourethane linkage (i.e., —NH—C(S)—S—) with an isothiocyanate group.

The polyol can be one or more polyether polyol(s), examples of which include poly(oxyalkylene) polyols or polyalkoxylated polyols. Poly(oxyalkylene) polyols can be prepared in accordance with known methods. A poly(oxyalkylene) polyol can be prepared by condensing an alkylene oxide, or a mixture of alkylene oxides, using an acid- or base-catalyzed addition with a polyhydric initiator or a mixture of polyhydric initiators, such as ethylene glycol, propylene glycol, glycerol, and sorbitol. Examples of alkylene oxides can include ethylene oxide, propylene oxide, butylene oxide, amylene oxide, aralkylene oxides, such as styrene oxide, mixtures of ethylene oxide and propylene oxide. Polyoxyalkylene polyols can be prepared with mixtures of alkylene oxide using random or step-wise oxyalkylation. Examples of such poly(oxyalkylene) polyols include polyoxyethylene polyols, such as polyethylene glycol, and polyoxypropylene polyols, such as polypropylene glycol.

Other polyether polyols include block polymers such as those having blocks of ethylene oxide-propylene oxide and/or ethylene oxide-butylene oxide. In some non-limiting embodiments, the polyether polyol comprises a block copolymer of the following formula:

HO—(CHR$_1$CHR$_2$—O)$_a$—(CHR$_3$CHR$_4$—O)$_b$—(CHR$_5$CHR$_6$—O)$_c$—H where here R$_1$ through R$_6$ can each independently represent hydrogen or methyl; and a, b, and c can each be independently selected from an integer from 0 to 300, where a, b, and c are selected such that the number average molecular weight of the polyol is less than about 32,000 grams/mole, or less than about 10,000 grams/mole, as determined by GPC.

Polyalkoxylated polyols can be represented by the following general formula:

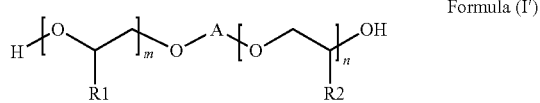

Formula (I')

where m and n can each be a positive integer, the sum of m and n being from 5 to 70; R$_1$ and R$_2$ are each hydrogen, methyl or ethyl; and A is a divalent linking group such as a straight or branched chain alkylene which can contain from 1 to 8 carbon atoms, phenylene, and C$_1$ to C$_9$ alkyl-substituted phenylene. The values of m and n can, in combination with the selected divalent linking group, determine the molecular weight of the polyol. A polyol, such as 4,4'-isopropylidenediphenol, can be reacted with an oxirane-containing material, such as ethylene oxide, propylene oxide or butylene oxide, to form what is commonly referred to as an ethoxylated, propoxylated or butoxylated polyol having hydroxyl functionality.

The polyether polyol can be PLURONIC ethylene oxide/propylene oxide block copolymers, such as PLURONIC R and PLURONIC L62D, and/or TETRONIC tetra-functional block copolymers based on ethylene oxide and propylene oxide, such as TETRONIC R, which are commercially available from BASF Corp.

As used herein, the phrase "polyether polyols" also can include poly(oxytetramethylene) diols prepared by the polymerization of tetrahydrofuran in the presence of Lewis acid catalysts such as, but not limited to boron trifluoride, tin (IV) chloride and sulfonyl chloride.

Examples of suitable polyether polyols include poly(propylene oxide) diols, copoly(ethylene oxide-propylene oxide) diols, and poly(tetramethylene oxide) diols.

The polyether polyol can be POLYMEG® 2000 polytetramethylene ether glycol (linear diol having a backbone of repeating tetramethylene units connected by ether linkages and capped with primary hydroxyls having a molecular weight of about 1900-2100 and a hydroxyl number of about 53.0 to about 59.0), commercially available from Lyondell.

The polyether polyol can be TERATHANE® 1000 polytetramethylene ether glycol is a blend of linear diols in which the hydroxyl groups are separated by repeating tetramethylene ether groups: HO(CH$_2$CH$_2$CH$_2$CH$_2$—O—)$_n$H, in which n averages 14 and having a hydroxyl number of 107-118, commercially available from INVISTA, or POLYMEG® 1000.

The polyol can be one or more polyester polyol(s), such as those selected from polyester glycols, polycaprolactone polyols, polycarbonate polyols and mixtures thereof. Examples of suitable polyester polyols include any well-known di-, tri-, or tetrahydroxy-terminated polyesters such as polylactone polyesters and polyester polyols produced by the polycondensation reactions of dicarboxylic acids or their anhydrides with di-, tri-, or tetra-alcohols.

Examples of such polyester polyols include polyester glycols, polycaprolactone polyols, polycarbonate polyols and mixtures thereof. Polyester glycols can include the esterification products of one or more dicarboxylic acids having from four to ten carbon atoms, such as adipic, succinic or sebacic acids, with one or more low molecular weight glycols having from two to ten carbon atoms, such as, but not limited to ethylene glycol, propylene glycol, diethylene glycol, 1,4-butanediol, neopentyl glycol, 1,6-hexanediol and 1,10-decanediol.

Examples of polycaprolactone polyols include those prepared by condensing caprolactone in the presence of difunctional active hydrogen material such as water or low molecular weight glycols, for example ethylene glycol and propylene glycol. Examples of suitable polycaprolactone polyols can include CAPA polycaprolactone polyols commercially available from Solvay Chemical of Houston, Tex., such as CAPA 2085 linear polyester diol derived from caprolactone monomer, terminated by primary hydroxyl groups, and having a mean molecular weight of 830 and a typical OH value of 135 mg KOH/g, and the TONE series from Dow Chemical of Midland, Mich., such as TONE 0201, 0210, 0230 and 0241. The polycaprolactone polyol may have a molecular weight ranging from about 500 to about 2000 grams per mole, or about 500 to about 1000 grams per mole.

Examples of polycarbonate polyols include aliphatic polycarbonate diols, for example those based upon alkylene glycols, ether glycols, alicyclic glycols or mixtures thereof. The alkylene groups for preparing the polycarbonate polyol can comprise from 5 to 10 carbon atoms and can be straight chain, cycloalkylene or combinations thereof. Examples of such alkylene groups include hexylene, octylene, decylene, cyclohexylene and cyclohexyldimethylene. Suitable polycarbonate polyols can be prepared by reacting a hydroxy terminated alkylene glycol with a dialkyl carbonate, such as methyl, ethyl, n-propyl or n-butyl carbonate, or diaryl carbonate, such as diphenyl or dinaphthyl carbonate, or by reacting of a hydroxy-terminated alkylene diol with phosgene or bischoloroformate, in a manner well-known to those skilled in the art. Examples of suitable polycarbonate polyols include POLY-CD 210 hydroxyl-terminated 1000 MW poly(1,6-hexanediol)carbonate polyol commercially available from Arch Chemical.

Mixtures of any of the above polyols can be used.

The polyol can have a number average molecular weight of about 100 to about 10,000 grams/mole, or about 500 to about 5,000 grams/mole, or about 600 to about 3500 grams/mole.

The polyol can comprise about 10 to about 90 weight percent of the reactants used for preparing the urethane, or about 30 to about 70 weight percent of the reactants, or about 35 to about 65 weight percent of the reactants.

The reaction may be accomplished in the presence or absence of diluents. Preferably diluents which include the hydrocarbons, such as aliphatic, cycloaliphatic and aromatic hydrocarbons, for example, benzene, toluene, cyclohexane, hexane, heptane and the like, are employed but other diluents, such as methyl isobutyl ketone, diamyl ketone, isobutyl methacrylate, triethyleneglycol dimethacrylate, and cyclohexyl methacrylate can also be beneficially utilized, if desired, especially where complete compatibility with the sealant system is desired.

The reaction products of the present invention can have a number average molecular weight ranging from about 500 to about 10,000 grams/mole, or about 1000 to about 7000 grams/mole.

The reaction products of the present invention are useful as an accelerator for the anaerobic cure system and/or as a component of the resin system. The reaction products thus form part of the reaction product, as it cross links into the (meth) acrylate matrix.

The reaction product of compound(s) of structure A with the isocyanate functional material can comprise about 5 to about 99 weight percent of the total weight of the reactants used for preparing the reaction product, or about 50 to about 95 weight percent, or about 85 weight percent of the reactants. The isocyanate functional material can comprise about 1 to about 30 weight percent of the total weight of the reactants used for preparing the reaction product, or about 10 to about 30 weight percent, or about 25 weight percent of the reactants.

Anaerobic curable compositions generally are based on a (meth)acrylate component, together with an anaerobic cure-inducing composition. The anaerobic curable composition of the present invention is based on the (meth)acrylate component, together with an anaerobic cure-inducing composition, which preferably has at least reduced levels of APH (such as about 50% or less by weight of that which is used in conventional anaerobic curable compositions), is substantially free of APH (less than about 10 weight percent, less than about 5 weight percent or less than about 1 weight percent) or is free of APH. In place of some or all of APH is the reaction product of the Present invention.

(Meth)acrylate monomers suitable for use as the (meth) acrylate component in the present invention may be selected from a wide variety of materials, such as those represented by $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein as the (meth)acrylate component in the present invention or as a component in making the reaction product include polyfunctional (meth)acrylate monomers, for example di- or tri-functional (meth)acrylates such as polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth)acrylates, diglycerol tetra(meth)acrylates, tetramethylene di(meth) acrylates, ethylene di(meth)acrylates, neopentyl glycol di(meth)acrylates, and bisphenol-A mono and di(meth)acrylates, such as ethoxylated bisphenol-A (meth)acrylate ("EBIPMA"), and bisphenol-F mono and di(meth)acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605,999 (Chu), incorporated herein by reference.

Other suitable monomers include polyacrylate esters represented by the formula

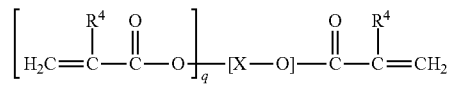

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, preferably 30, and most preferably about 20.

For example, X can be an organic radical of the formula:

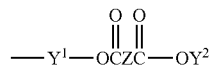

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms.

Other classes of useful monomers are the reaction products of di- or tri-alkylolamines (e.g., ethanolamines or propanolamines) with acrylic acids, such as are disclosed in French Patent No. 1,581,361.

Examples of useful acrylic ester oligomers include those having the following general formula:

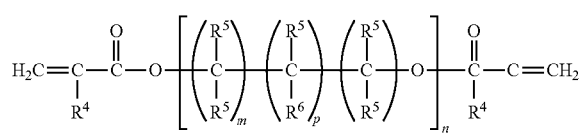

where $R^5$ represents a radical selected from hydrogen, lower alkyl of from 1 to about 4 carbon atoms, hydroxy alkyl of from 1 to about 4 carbon atoms, and

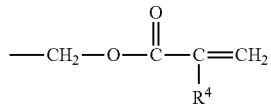

where $R^4$ is a radical selected from hydrogen, halogen, or lower alkyl of from 1 to about 4 carbon atoms; $R^6$ is a radical selected from hydrogen, hydroxyl, or

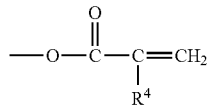

m is an integer equal to at least 1, e.g., from 1 to about 15 or higher, and preferably from 1 to about 8; n is an integer equal to at least 1, e.g., 1 to about 40 or more, and preferably between about 2 and about 10; and p is 0 or 1.

Typical examples of acrylic ester oligomers corresponding to the above general formula include di-, tri- and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from the group consisting of labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureido groups. The monofunctional alkyl and aryl acrylate esters are preferably the acrylates and methacrylates containing hydroxy or amino functional groups on the non-acrylate portion thereof. Acrylate esters suitable for use have the formula

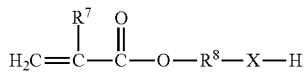

where X is selected from —O— or

and $R^9$ is selected from hydrogen or lower alkyl of 1 through 7 carbon atoms; $R^7$ is selected from hydrogen, chlorine or methyl and ethyl radicals; and $R^8$ is a divalent organic radical selected from lower alkylene of 1 through 8 carbon atoms. Phenylene or naphthylene. These groups upon proper reaction with a polyisocyanate, yield monomer of the following general formula:

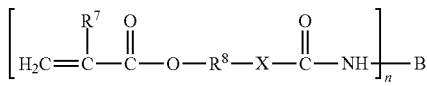

where n is an integer from 2 to about 6; B is organic radical selected from alkyl, alkenyl, cycloalkyl, cycloalkenyl, aryl, aralkyl, alkaryl or heterocyclic radicals both substituted and unsubstituted; and $R^7$, $R^8$ and X have the meanings given above.

Of course, combinations of these (meth)acrylate monomers may also be used.

The (meth)acrylate component can comprise from about 10 to about 90 percent by weight of the composition, such as about 60 to about 90 percent by weight, based on the total weight of the composition.

The inventive reaction products useful as anaerobic cure accelerators may be used in amounts of about 0.1 to about 95 percent by weight, such as about 10 to about 50 percent by weight, based on the total weight of the composition. The inventive reaction products useful as anaerobic cure accelerators may be used in combination with conventional accelerators (though at lower levels than such conventional accelerators).

To the (meth)acrylate component, anaerobic cure-inducing composition and the inventive reaction product may be added components that have been included in traditional anaerobic adhesives to alter the physical properties of either the formulation or the reaction products thereof. For instance, one or more of maleimide components, thermal resistance-conferring co reactants, diluent components reactive at elevated temperature conditions, mono- or poly-hydroxyalkanes, polymeric plasticizers, and chelators (see U.S. Pat. No. 6,391, 993, incorporated herein by reference) may be included to modify the physical property and/or cure profile of the formulation and/or the strength or temperature resistance of the cured adhesive.

When used, the maleimide, co-reactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, free radical co-accelerators, and inhibitors of free radical generation, as well as metal catalysts.

A number of well-known initiators of free radical polymerization are typically incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

As noted, conventional accelerators of free radical polymerization may also be used in conjunction with the inventive anaerobic cure accelerators, though in amounts less than that used in the past. Such accelerators are typically of the hydrazine variety (e.g., APH), as disclosed in U.S. Pat. No. 4,287,350 (Rich) and U.S. Pat. No. 4,321,349 (Rich). Maleic acid is usually added to APH-containing anaerobic cure systems. One benefit of the present invention is that the inventive anaerobic cure accelerators render the use of such acids unnecessary in preparing anaerobic adhesive compositions.

Co-accelerators of free radical polymerization may also be used in the compositions of the present invention including, without limitation, organic amides and imides, such as benzoic sulfimide (also known as saccharin) (see U.S. Pat. No. 4,324,349).

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001 percent by weight to about 0.1 percent by weight, based on the total weight of the composition.

Metal catalyst solutions or pre-mixes thereof are used in amounts of about 0.03 to about 0.1 percent by weight.

Other additives such as thickeners, non-reactive plasticizers, fillers, toughening agents (such as elastomers and rubbers) and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. An appropriate primer for anaerobic curable compositions may be applied to a surface of the chosen substrate to enhance cure rate. Or, the inventive anaerobic cure accelerators may be applied to the surface of a substrate as a primer. See e.g. U.S. Pat. No. 5,811,473 (Ramos).

In addition, the invention provides a method of preparing an anaerobic curable composition, a step of which includes mixing together a (meth)acrylate component, an anaerobic cure inducing composition, and an anaerobic cure accelerator reaction product.

The invention also provides a process for preparing a reaction product from the anaerobic curable composition of the present invention, the steps of which include applying the composition to a desired substrate surface and exposing the composition to an anaerobic environment for a time sufficient to cure the composition.

This invention also provides a method of using as a cure accelerator for anaerobic curable composition, an anaerobic cure accelerator reaction product as discussed above.

And the present invention Provides a method of using an anaerobic cure accelerator compound, including (I) mixing the anaerobic cure accelerator compound in an anaerobic curable composition or (II) applying onto a surface of a substrate the anaerobic cure accelerator compound and applying thereover an anaerobic curable composition. Of course, the present invention also provides a bond formed between mated substrates with the inventive composition.

In view of the above description of the present invention, it is clear that a wide range of practical opportunities are provided. The following examples are illustrative purposes only, and are not to be construed so as to limit in any way the teaching herein.

EXAMPLES

Synthesis Of Compounds Of Structure A

An investigation was performed to evaluate reaction product(s) of glycidol and indoline or THQ and certain alkylated indoline or THQ adducts as replacements for APH as a cure accelerator in anaerobic curable compositions, such as adhesives.

An investigation was performed to evaluate reaction product(s) of glycidol and indoline or THQ as replacements for APH as a cure accelerator in anaerobic curable compositions, such as adhesives. Indoline-glycidol adducts were prepared in accordance with the synthetic scheme depicted below:

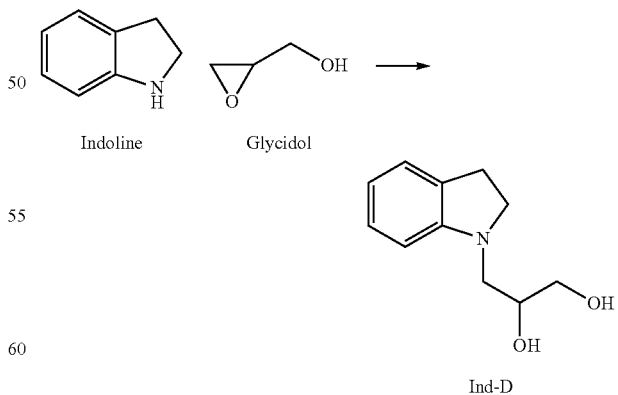

To a 500 ml four-neck round bottom flask, equipped with a condenser, addition funnel, nitrogen purge, magnetic stir bar and thermo-probe was added glycidol [62 grams; 805 mmoles]. The flask was placed in an ice bath, after which indoline [97 grams; 805 mmoles] was added with mixing and under a nitrogen purge. Mixing was continued for a period of time of 2 hours, at which point a solid was observed to form.

The so formed solid was recrystallized with acetone by heating the solid-acetone mixture to 50° C. with mixing until a solution forms. The temperature was then reduced to 38° C., where the solid was observed to reform. The mixture was then filtered, the solid collected and vacuum dried in an oven at 50° C.

THQ-glycidol adducts were prepared in accordance with the synthetic scheme depicted below:

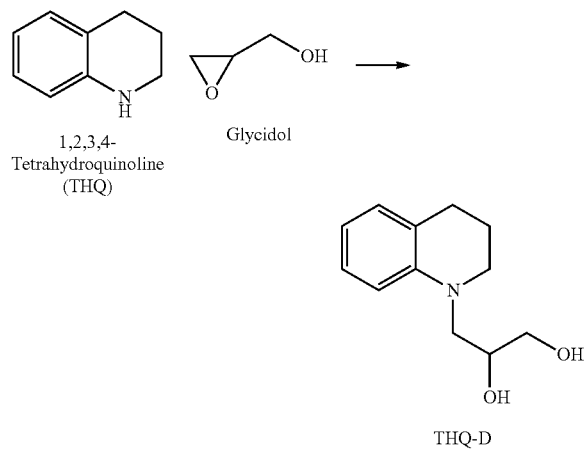

To a 500 ml four-neck round bottom flask, equipped with a condenser, addition funnel, nitrogen purge, magnetic stir bar and thermo-probe was added glycidol [8 grams; 108 mmoles] and THQ [14 grams; 108 mmoles]. The flask was placed on a hot plate maintained at 60° C. for 9 hours, during which time stirring continued. The reaction mixture was allowed to stand overnight at room temperature. 100 ml of deionized water was added, and the reaction mixture was again heated to 60° C.

The mixture was recrystallized with a combination of isopropyl alcohol/water, followed by deionized water, where a solid was observed to reform. The mixture was then filtered, the solid collected and vacuum dried in an oven at 50° C.

Synthesis of Reaction Products from Compounds of Structure A, an Isocyanate Functional Material, a (Meth)acrylate Compound and a Hydroxy-Functional Compound The following procedure was used to prepare a resin (0.6 kg theoretical yield) as a reaction product from ~7.0% (wt/wt) compound of structure A, tetramethylxylene diisocyanate ("TMXDI") and tetrahydrofurfuyl ("THF") methacrylate:

A reaction product in accordance with the present invention was prepared from the following materials in the noted weights percentages. Initially, to a 500 mL jacketed reaction vessel equipped with a stirring rod, thermocouple, air inlet, and air outlet was added with mixing 39.37%, TMXDI; 20.79%, Poly(tetrahydrofuran)-250; 20.10%, THF methacrylate; 0.05%, IRGANOX 1010; 0.05%, MeHQ; and 0.10%, dibutyl tin dilaurate ("DBTDL") and allowed to react for 1 hour at 75° C. under an air sweep. 12.13%, Hydroxypropyl methacrylate ("HPMA") was then added and allowed to react for 2 hours at a temperature of 75° C. Residual NCO was then checked. 6.91%, THQ-glycidol adduct was added and allowed to react for 3 hours at a temperature of 75° C. Finally, 0.50%, EDTA in ethylene glycol was added with stirring allowed to continue for 15 minutes.

The reaction product so prepared is referred to herein as Resin 1. Resin 1 was used to prepare Samples C-F. Resin 2 was made by adjusting downward the amount of THQ-glycidol adduct to about 3%. Resin 2 was used to prepare Samples G-J. Resin 3 was made by using an indoline-glycidol adduct in an amount of 6.91%. Resin 3 was used to prepare Samples K-N.

Preparation of Anaerobic Curable Compositions

Here, the noted components in the amounts indicated in the tables below were used to formulate six anaerobic curable compositions. Samples A and B were each used as a control, with Sample A being accelerated with DE-p-T and Sample B not. In Table 1, Samples C-F included the inventive reaction product (Resin 1, as noted above) in amounts ranging from 10 to 40 parts (in this case, weight percentage) in increments of 10 parts. In Table 2, Samples G-J included the inventive reaction product (Resin 2, as noted above) in amounts ranging from 10 to 40 parts (in this case, weight percentage) in increments of 10 parts. In Table 3, Samples K-N included the inventive reaction product (Resin 3, as noted above) in amounts ranging from 10 to 40 parts (in this case, weight percentage) in increments of 10 parts.

TABLE 1

| Generic Description | A part | B part | C part | D part | E part | F part |
|---|---|---|---|---|---|---|
| Dimethacrylate Monomer | 74.30 | 75.10 | 65.10 | 55.10 | 45.10 | 35.10 |
| Accelerating Resin | 0.00 | 0.00 | 10.00 | 20.00 | 30.00 | 40.00 |
| Stabilizer | 0.40 | 0.40 | 0.40 | 0.40 | 0.40 | 0.40 |
| Chelator | 2.50 | 2.50 | 2.50 | 2.50 | 2.50 | 2.50 |
| Plasticizer | 20.00 | 20.00 | 20.00 | 20.00 | 20.00 | 20.00 |
| Saccharin | 1.00 | 1.00 | 1.00 | 1.00 | 1.00 | 1.00 |
| Accelerator | 0.80 | 0.00 | 0.00 | 0.00 | 0.00 | 0.00 |
| Initiator | 1.00 | 1.00 | 1.00 | 1.00 | 1.00 | 1.00 |
|  | 100.00 | 100.00 | 100.00 | 100.00 | 100.00 | 100.00 |

TABLE 2

| Generic Description | A part | B part | G part | H part | I part | J part |
|---|---|---|---|---|---|---|
| Dimethacrylate Monomer | 74.30 | 75.10 | 65.10 | 55.10 | 45.10 | 35.10 |
| Accelerating Resin | 0.00 | 0.00 | 10.00 | 20.00 | 30.00 | 40.00 |
| Stabilizer | 0.40 | 0.40 | 0.40 | 0.40 | 0.40 | 0.40 |
| Chelator | 2.50 | 2.50 | 2.50 | 2.50 | 2.50 | 2.50 |
| Plasticizer | 20.00 | 20.00 | 20.00 | 20.00 | 20.00 | 20.00 |
| Saccharin | 1.00 | 1.00 | 1.00 | 1.00 | 1.00 | 1.00 |
| Accelerator | 0.80 | 0.00 | 0.00 | 0.00 | 0.00 | 0.00 |
| Initiator | 1.00 | 1.00 | 1.00 | 1.00 | 1.00 | 1.00 |
|  | 100.00 | 100.00 | 100.00 | 100.00 | 100.00 | 100.00 |

TABLE 3

| Generic Description | A part | B part | K part | L part | M part | N part |
|---|---|---|---|---|---|---|
| Dimethacrylate Monomer | 74.30 | 75.10 | 65.10 | 55.10 | 45.10 | 35.10 |
| Accelerating Resin | 0.00 | 0.00 | 10.00 | 20.00 | 30.00 | 40.00 |
| Stabilizer | 0.40 | 0.40 | 0.40 | 0.40 | 0.40 | 0.40 |
| Chelator | 2.50 | 2.50 | 2.50 | 2.50 | 2.50 | 2.50 |
| Plasticizer | 20.00 | 20.00 | 20.00 | 20.00 | 20.00 | 20.00 |
| Saccharin | 1.00 | 1.00 | 1.00 | 1.00 | 1.00 | 1.00 |

TABLE 3-continued

| Generic Description | A part | B part | K part | L part | M part | N part |
|---|---|---|---|---|---|---|
| Accelerator | 0.80 | 0.00 | 0.00 | 0.00 | 0.00 | 0.00 |
| Initiator | 1.00 | 1.00 | 1.00 | 1.00 | 1.00 | 1.00 |
| | 100.00 | 100.00 | 100.00 | 100.00 | 100.00 | 100.00 |

In preparing the samples, the first five components in each table were mixed in the order listed. The components were mixed using a stainless steel propeller-type mixer such that the components were dissolved. The remaining components were added and mixed as above.

Physical Property Evaluation

Breakloose/prevail adhesion testing was performed according to ASTM D5649. Breakloose torque is the initial torque required to decrease or eliminate the axial load in a seated assembly. Prevailing torque, after initial breakage of the bond, is measured at any point during 360° rotation of the nut. Prevailing torque is normally determined at 180° rotation of the nut. Steel ⅜×16 nuts and bolts were degreased with 1,1,1-trichloroethylene, adhesive was applied to the bolt, and the nut was screwed onto the bolt with a steel collar as a spacer.

Twenty nut and bolt specimens were assembled for each adhesive formulation tested. For the break/prevail adhesion tests, the specimens were maintained at ambient temperature for 15 minutes, 30 minutes, 1 hour and 24 hours after assembly (five specimens each). The break and prevail torque strengths (in-$lb_f$) were then recorded for five specimens of each adhesive formulation after 15 minutes, 30 minutes, one hour and after 24 hours at ambient temperature (25° C.) and 45-50% relative humidity, respectively. The torque strengths were measured using a calibrated automatic torque analyzer. The data for these evaluations as regards Resin 1 is set forth in Table 4 below and with reference to FIG. 1.

TABLE 4

| | Time (mins.) | | | |
|---|---|---|---|---|
| Sample | 15 | 30 | 60 | 1440 |
| A | 115 | 148 | 191 | 271 |
| B | 74 | 85 | 111 | 240 |
| C | 116 | 151 | 169 | 254 |
| D | 120 | 160 | 179 | 264 |
| E | 117 | 151 | 172 | 252 |
| F | 124 | 137 | 143 | 230 |

This data indicates that Samples C-F in accordance with this invention exhibited generally similar breakloose and prevail properties at room temperature compared to a traditional anaerobic (meth)acrylate-based adhesive composition (Sample A) when applied and cured on the substrates, and better performance than an otherwise similar sample, but without an accelerator (Sample B).

Figure 2:
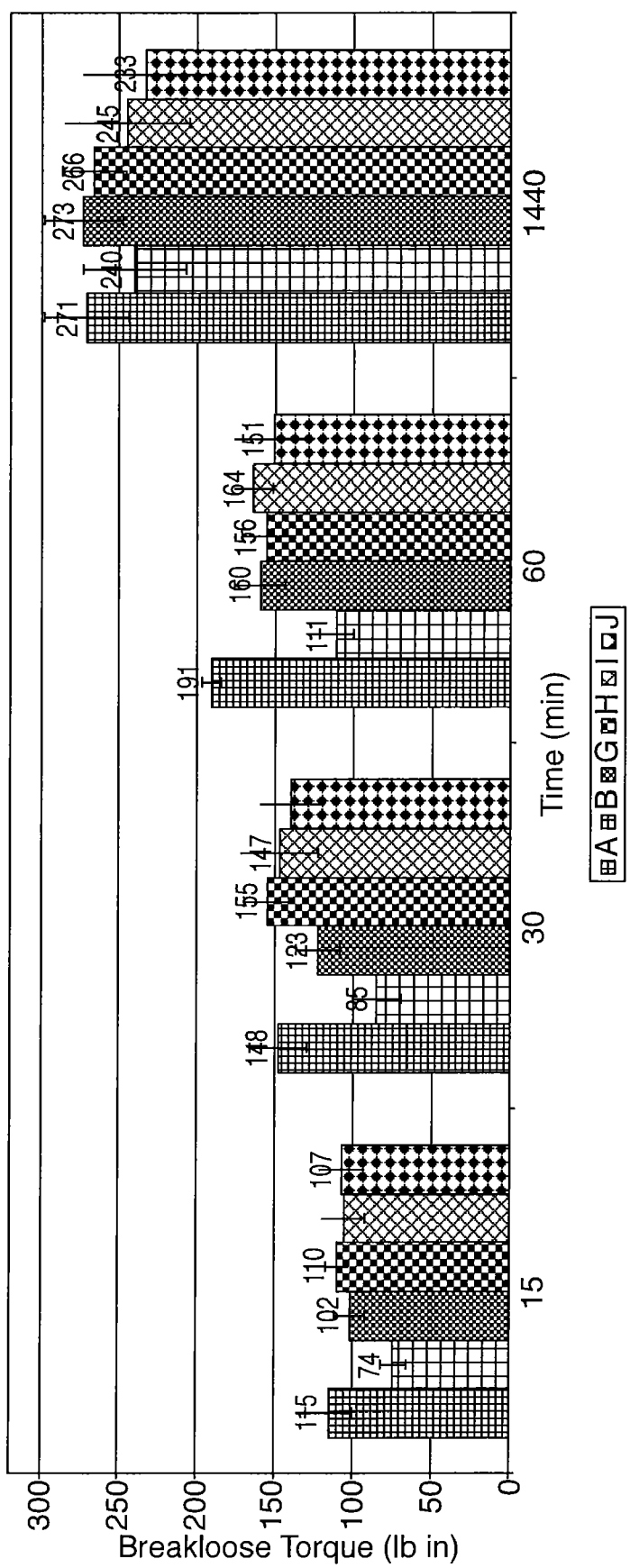
FIG. 2 depicts a plot of breakloose break strength vs. time of anaerobic adhesive compositions including Resin 2 (made from about 3% w/w THQ-glycidol adduct), some of which using the inventive cure accelerators, on steel nuts and bolts with a spacer therebetween.

The data for these evaluations as regards Resin 2 is set forth in Table 5 below and with reference to FIG. 2.

TABLE 5

| | Time (mins.) | | | |
|---|---|---|---|---|
| Sample | 15 | 30 | 60 | 1440 |
| A | 115 | 148 | 191 | 271 |
| B | 74 | 85 | 111 | 240 |

TABLE 5-continued

| | Time (mins.) | | | |
|---|---|---|---|---|
| Sample | 15 | 30 | 60 | 1440 |
| G | 102 | 123 | 160 | 273 |
| H | 110 | 155 | 156 | 266 |
| I | 106 | 147 | 164 | 245 |
| J | 107 | 140 | 151 | 233 |

This data indicates that Samples G-J in accordance with this invention exhibited generally similar breakloose and prevail properties at room temperature compared to a traditional anaerobic (meth)acrylate-based adhesive composition (Sample A) when applied and cured on the substrates, and better performance than an otherwise similar sample, but without an accelerator (Sample B).

Figure 3:
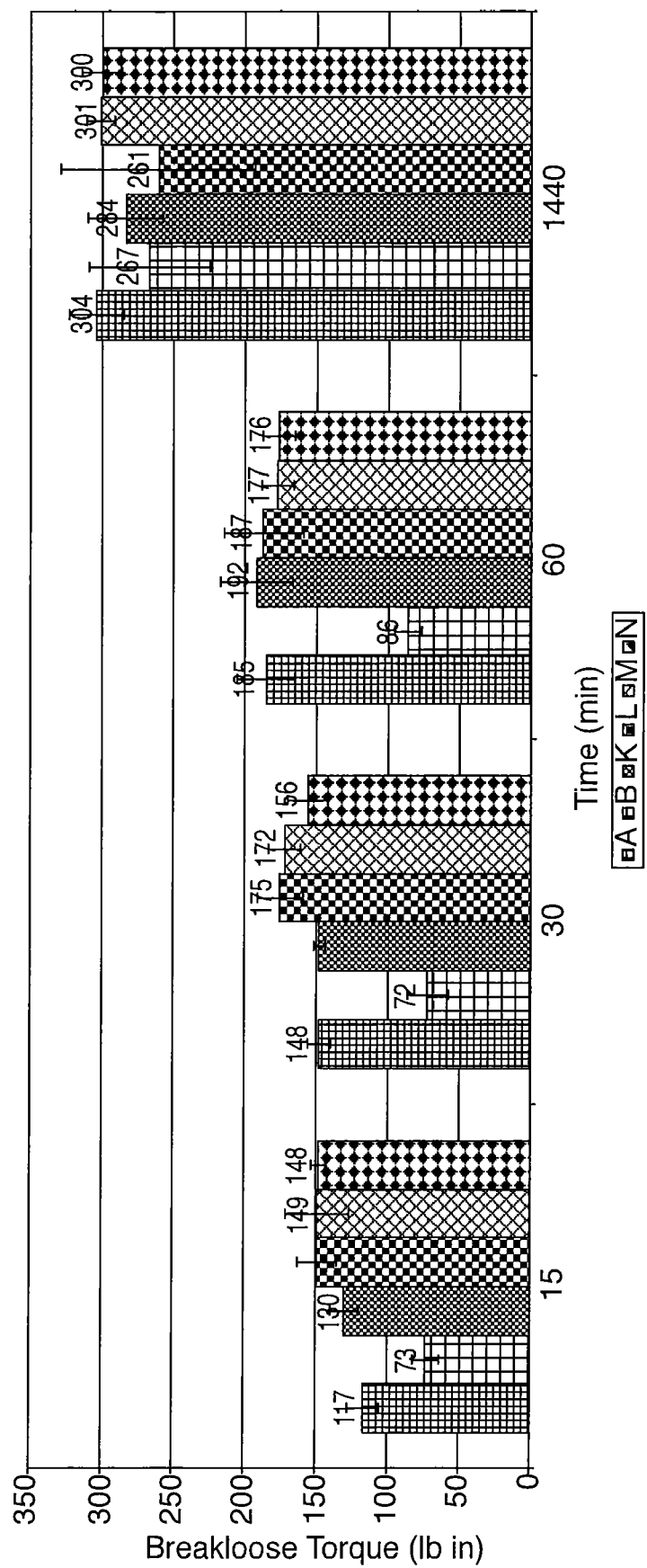
FIG. 3 depicts a plot of breakloose prevail strength vs. time of anaerobic adhesive compositions including Resin 3 (made from about 3% w/w indoline-glycidol adduct), some of which using the inventive cure accelerators, on steel nuts and bolts with a spacer therebetween.

The data for these evaluations as regards Resin 3 is set forth in Table 6 below and with reference to FIG. 3.

TABLE 6

| | Time (mins.) | | | |
|---|---|---|---|---|
| Sample | 15 | 30 | 60 | 1440 |
| A | 117 | 148 | 185 | 304 |
| B | 73 | 72 | 86 | 267 |
| K | 130 | 148 | 192 | 284 |
| L | 149 | 175 | 187 | 261 |
| M | 149 | 172 | 177 | 301 |
| N | 148 | 156 | 176 | 300 |

This data indicates that Samples K-N in accordance with this invention exhibited generally similar, and slightly better, breakloose and prevail properties at room temperature compared to a traditional anaerobic (meth)acrylate-based adhesive composition (Sample A) when applied and cured on the substrates, and better performance than an otherwise similar sample, but without an accelerator (Sample B).

What is claimed is:

1. A reaction product prepared from reactants comprising:
   (a) a compound embraced within structure A

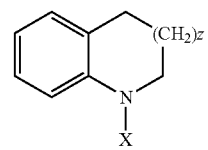

where X is $C_{1-20}$ alkyl, $C_{2-20}$ alkenyl, or $C_{7-20}$ alkaryl, any of which may be interrupted by one or more hereto atoms, and which are functionalized by at least one group selected from —OH, —$NH_2$ or —SH and z is 1-3 and
   (b) at least one isocyanate functional material.

2. The reaction product of claim 1, further comprising as reactant (c) at least one functional material selected from the group consisting of hydroxy functional materials, amino functional materials, thio functional materials, and combinations and mixtures thereof.

3. The reaction product of claim 1, further comprising as a reactant (d) at least one (meth)acrylate-functional material.

4. The reaction product according to claim 2, wherein the hydroxy functional material is a hydroxy functional (meth)acrylate.

5. The reaction product according to claim 4, wherein the hydroxy functional (meth)acrylate is selected from the group consisting of hydroxymethyl (meth)acrylate, hydroxyethyl (meth)acrylate, hydroxypropyl (meth)acrylate, hydroxybutyl (meth)acrylate, hydroxypentyl (meth)acrylate, hydroxypropoxypropyl (meth)acrylate, diethylene glycol diacrylate, hexanediol diacrylate, neopentyl glycol diacrylate, polyethylene glycol diacrylate, trimethylolpropane diacrylate and mixtures thereof.

6. The reaction product according to claim 1, wherein the reaction product comprises residual isocyanate functionality.

7. The reaction product according to claim 1, wherein the at least one isocyanate functional material is selected from the group consisting of ethylene diisocyanate, trimethylene diisocyanate, 1,6-hexamethylene diisocyanate (HDI), tetramethylene diisocyanate, hexamethylene diisocyanate, octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, bis(isocyanatoethyl)ether, trimethylhexane diisocyanate, trimethylhexamethylene diisocyanate (TMDI), 2,2'-dimethylpentane diisocyanate, 2,2,4-trimethylhexane diisocyanate, 2,4,4,-trimethylhexamethylene diisocyanate, 1,8-diisocyanato-4-(isocyanatomethyl) octane, 2,5,7-trimethyl-1,8-diisocyanato-5-(isocyanatomethyl) octane, 2-isocyanatopropyl-2,6-diisocyanatohexanoate, lysinediisocyanate methyl ester, lysinetriisocyanate methyl ester, 4,4'-methylene-bis-(cyclohexyl isocyanate), 4,4'-isopropylidene-bis-(cyclohexyl isocyanate), 1,4-cyclohexyl diisocyanate (CHDI), 4,4'-dicyclohexylmethane diisocyanate, isophorone diisocyanate (IPDI), meta-tetramethylxylylene diisocyanate (TMXDI) and mixtures thereof.

8. The reaction product of claim 1, further comprising as a reactant (e) at least one diol.

9. An anaerobic curable composition comprising:
(a) a (meth)acrylate component;
(b) an anaerobic cure-inducing composition; and
(c) the reaction product of claim 1.

10. The composition according to claim 9, wherein the anaerobic cure-inducing composition comprises a hydroperoxide selected from the group consisting of t-butyl hydroperoxide, p-methane hydroperoxide, cumene hydroperoxide (CHP), diisopropylbenzene hydroperoxide, and mixtures thereof.

11. The composition according to claim 9, further comprising at least one accelerator.

12. The composition according to claim 11, wherein the accelerator is selected from the group consisting of amines, amine oxides, sulfonamides, metal sources, acids, and mixtures thereof.

13. The composition according to claim 11, wherein the accelerator is selected from the group consisting of triazines, ethanolamine, diethanolamine, triethanolamine, N,N dimethyl aniline, benzene sulphanimide, cyclohexyl amine, triethyl amine, butyl amine, saccharin, N,N-diethyl-p-toluidine, N,N-dimethyl-o-toluidine, acetyl phenylhydrazine, maleic acid, and mixtures thereof.

14. The composition according to claim 9, further comprising at least one stabilizer.

15. The composition according to claim 14, wherein the stabilizer is selected from the group consisting of benzoquinone, naphthoquinone and anthraquinone, hydroquinone, methoxyhydroquinone, butylated hydroxy toluene, ethylene diamine tetraacetic acid or a salt thereof, and mixtures thereof.

16. A method of making a reaction product prepared from reactants comprising reacting:
(a) a compound embraced within structure A

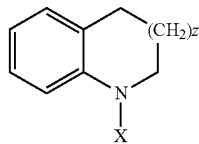

where X is $C_{1-20}$ alkyl, $C_{2-20}$ alkenyl, or $C_{7-20}$ alkaryl, any of which may be interrupted by one or more hereto atoms, and which are functionalized by at least one and preferably at least two groups selected from —OH, —$NH_2$ or —SH and z is 1-3; and
(b) at least one isocyanate functional material;
(c) optionally, at least one functional material selected from the group consisting of hydroxy functional materials, amino functional materials, thio functional materials, and combinations and mixtures thereof;
(d) optionally, at least one (meth)acrylate-functional material; and
(e) at least one diol.

* * * * *